United States Patent [19]

Vinarcsik et al.

[11] 4,375,820
[45] Mar. 8, 1983

[54] ROLLER FOR USE IN A CONVEYOR-ROLLER STRUCTURE

[75] Inventors: Joseph E. Vinarcsik, Flossmoor; John A. Jachim, Chicago, both of Ill.

[73] Assignee: Hi-Hard Rolls, Inc., Harvey, Ill.

[21] Appl. No.: 729,134

[22] Filed: Oct. 4, 1976

[51] Int. Cl.³ .............................................. B08B 3/02
[52] U.S. Cl. ................................ 134/122 R; 134/199; 266/113; 266/114
[58] Field of Search ............... 134/64 R, 64 P, 83, 134/122 R, 122 P, 151, 165, 199; 266/113, 114

[56] References Cited

U.S. PATENT DOCUMENTS

| | | | |
|---|---|---|---|
| 1,095,445 | 5/1914 | Alvey | 193/1 |
| 2,696,823 | 12/1954 | Scott | 134/122 R |
| 3,023,756 | 3/1962 | Proctor | 134/199 X |
| 3,056,164 | 10/1962 | Reichel et al. | 134/122 R |
| 3,629,015 | 12/1971 | Yonezawa et al. | 266/113 X |
| 3,651,857 | 3/1972 | Koch | 134/199 X |

OTHER PUBLICATIONS

"United States Steel", *Lorig-Aligner Self-Centering Rolls;* 11-16-56, (see front cover and pp. 11 & 17).

*Primary Examiner*—Robert L. Bleutge
*Attorney, Agent, or Firm*—Trexler, Bushnell & Wolters, Ltd.

[57] ABSTRACT

A roller apparatus is disclosed for use in a steel sheet transporting device including a table, a plurality of rolls upon which the steel sheet is transported, and water spray nozzles for cooling the rolls and the steel sheet. The roller apparatus including a plurality of helically arranged grooves for tracking the steel sheet to keep it centered as it passes over the transporting device, and for maintaining a controlled and even film of water over said rolls to cool the rolls and steel sheet while preventing the sheet from hydroplaning.

3 Claims, 4 Drawing Figures

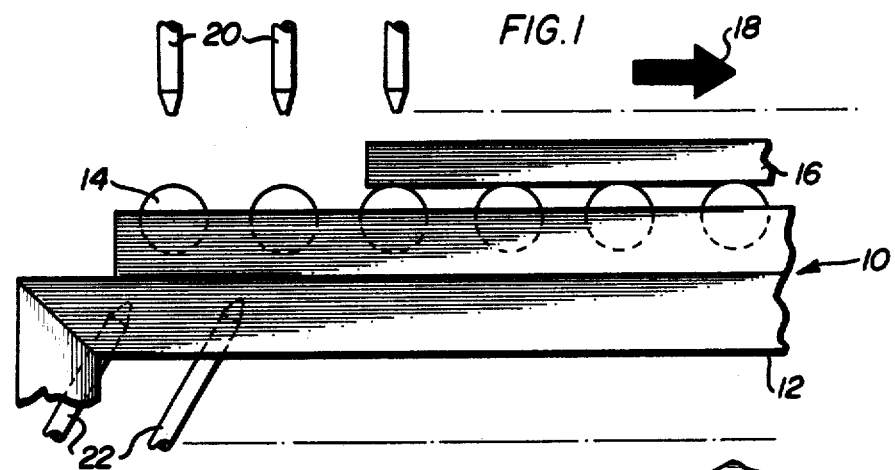
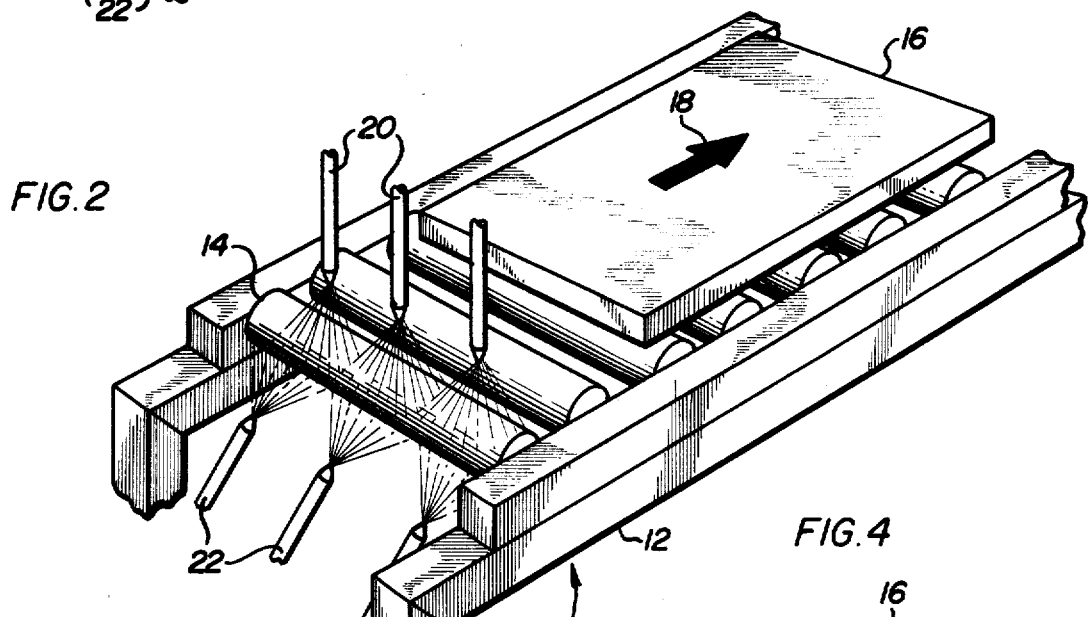
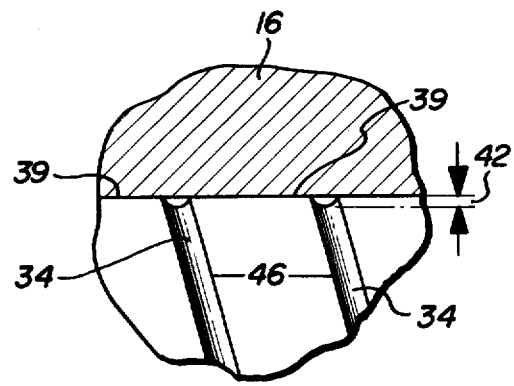
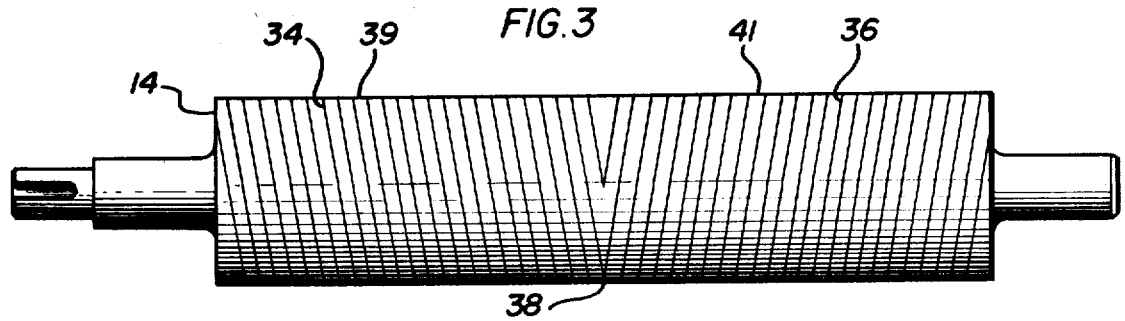

ROLLER FOR USE IN A CONVEYOR-ROLLER STRUCTURE

BACKGROUND OF THE INVENTION

The present invention relates generally to a roller apparatus, and, more particularly, to a roller apparatus for use in a conveyor-roller structure for transporting heavy loads. Specifically, the invention is directed to a roller apparatus for use in conjunction with a conveyor structure for hot metal sheets, being processed in accordance with various known mill procedures.

In many mills it is common practice to transport sheets of steel or other metals on a roller-conveyor structure while the sheets are at relatively high temperatures. Because of the high temperature of the sheets, there is the problem of damage to the rollers from overheating, thereby requiring premature replacement of the rollers. It is preferable, therefore, to make provision for evenly distributed cooling of the rollers and, in certain instances, the sheets to prevent such damage from occurring.

Problems are also sometimes encountered in maintaining the sheet in alignment with the roller conveyor and this problem may be aggravated in instances where cooling water or other liquid is applied to the surfaces of the rollers and/or the sheet.

SUMMARY AND OBJECTS OF THE INVENTION

Accordingly, it is an object of the present invention to provide a roller apparatus including means for tracking a sheet being transported to keep it centered as it passes over the roller apparatus.

It is another object of the present invention to provide a roller apparatus especially suitable for handling hot metal sheets further including means for cooling the roller apparatus and/or the sheets as the sheets pass over the roller apparatus.

A further object of the present invention is to provide a roller apparatus further including means for maintaining an even distribution of coolant over the roller apparatus for evenly and effectively cooling the apparatus and a sheet being transported thereon, and for preventing hydroplaning of the sheet as it passes over the roller apparatus.

Briefly, the roller or conveyor according to the present invention includes a cylindrical roller provided with suitable means for mounting in a table structure. The body of the roller is provided with a plurality of helical grooves formed in the cylindrical surface of the roller, the grooves being disposed regularly about the circumference of the roller and traveling spirally inwardly from opposite ends to the longitudinal center of said roller to form right-hand and left-hand spirals, respectively. The grooves define oppositely spiralling surfaces on the roller which engage the sheet and tend to urge the sheet to a center position on the roller. In addition, the grooves provide coolant distribution channels for evenly spreading cooling liquid around the roller which minimizes any build-up of cooling liquid on said spiral surfaces which might cause hydroplaning and loss of control of the sheet.

Other objects, features and advantages of the present invention may be more fully realized and understood from the following detailed description when taken in conjunction with accompanying drawings wherein like reference numerals throughout the various views of the drawings are intended to designate similar elements and components.

BRIEF DESCRIPTION OF THE DRAWINGS

FIG. 1 is a side elevational view of a plurality of rollers, according to the apparatus of the present invention, cooperating with a conveyor-roller structure with water cooling means.

FIG. 2 is a perspective view of FIG. 1.

FIG. 3 is a detailed elevational view of a roller apparatus constructed in accordance with the present invention.

FIG. 4 is an enlarged view of a portion of FIG. 2 showing a plurality of grooves cut into the surface of the roller apparatus in accordance with the present invention.

DETAILED DESCRIPTION OF THE ILLUSTRATED EMBODIMENT

Referring now to FIG. 1 and FIG. 2, a roller-conveyor structure is designated generally by the reference numeral 10. The roller-conveyor structure includes a table 12 rotatably supporting a plurality of rollers 14. In the illustrated embodiment, the conveyor structure is shown transporting a sheet 16 of steel or other hot metal in a direction of travel indicated by the arrow 18. Also provided is a plurality of water supply means or nozzles designated generally by reference numerals 20 and 22 mounted with respect to the conveyor table by suitable means, not shown, and disposed both above the sheet and below the roller-conveyor structure, for spraying water upon the sheet from the top and upon the rollers and sheet from the bottom for the purpose of cooling the rollers and the sheet.

Referring now to FIG. 3, a roller 14 in accordance with the present invention as illustrated. The roller 14 is provided with ends of a suitable design to be rotatably mounted on the table 12 of FIGS. 1 and 2. The roller 14 has a body of generally cylindrical shape, and is provided with a plurality of grooves designated generally by reference numerals 34 and 36, cut or otherwise formed in its surface. The grooves are disposed on the surface of the roller 14 in a generally helical fashion, so as to travel spirally inwardly from opposite ends to the longitudinal center 38 of the roller to form right-hand spirals, designated generally by reference numeral 34, and left-hand spirals, designated generally by reference numeral 36, respectively. The grooves define therebetween right-hand spiral surfaces 39 and left-hand spiral surfaces 41 which normally frictionally contact the sheet 16 moving thereover and bias the sheet in opposite direction toward the center of the roller. Of course, each of the rollers is similarly constructed and this centering or tracking action of successive rollers tends to maintain the sheet in alignment with the conveyor.

In FIG. 4, representative individual grooves of FIG. 3 are shown somewhat enlarged to permit greater detail. In this view, the manner in which the spiral surfaces or lands between the groove frictionally engage the sheet is clearly shown. The grooves have a depth indicated by the arrows 42, and a typical lead between grooves is designated by the arrows 46. As a specific example for illustrating the present embodiment, and to which no limitation is intended, the right-hand and left-hand grooves may each comprise three separate spirals having a typical depth 42 of 1 millimeter and a typical lead 46 of 24 millimeters.

In operation, cooling water is sprayed on the rollers and the undersurface of the sheet from the spray heads or other suitable applying means 20 and 21. A film of such water tends to build up between the rollers and the sheet. If the film thickness becomes excessive, a hydroplaning action may take place. In other words, frictional contact between the surface portions 39 and 41 and the sheet may be lost with resulting loss of the centering or tracking action. However, as shown in FIG. 4, the grooves provide effective channels of substantial depth between the spiral surface portion 39 and 41. These channels effectively drain away excess water from the surface portion 39 and 41 to prevent such hydroplaning of the sheet while at the same time permitting a relatively large volume of water to be applied to and evenly distributed over the roller for more effective cooling. It is noted that the grooves 34 and 36 may each include a plurality of separate spirals so that the grooves may be relatively closely spaced while at the same time have a substantial lead angle for enhancing the centering action while also insuring the desired dispersal of water from the surface 39 and 41.

While a preferred embodiment of the present invention has been shown and described herein, it is obvious that many details may be changed without deparating from the spirit and scope of the appended claims.

The invention is claimed as follows:

1. A roller for use with a conveyor including a plurality of rollers rotating in a predetermined feeding direction and upon which hot metal sheet material is transported substantially tangentially and substantially in a generally horizontal direction with coolant applied to the sheet material and the rollers; said roller having a cylindrical surface with oppositely extending alternating helical lands and grooves formed in said surface and leading outwardly from a generally central portion and diverging in the predetermined feeding direction of rotation of the roller for tracking the material to be transported to keep it centered upon the roller as it passes thereover, said grooves defining therebetween the helical lands extending between outer edges of adjacent grooves with a surface extent many times greater than the width and depth of the grooves as the major outer material contacting surfaces of the roller for centering the material and with the grooves draining off coolant for maintaining an even film of coolant over the lands of said roller while preventing hydroplaning of the material.

2. A roller as claimed in claim 1, wherein the grooves means define left and right hand spiral formations from a generally central portion toward the ends of the roller.

3. A roller as claimed in claim 2, wherein the spiral formations converge toward generally central apical portions pointing in a direction away from and trailing the predetermined feeding direction of rotation of the roller.

* * * * *